United States Patent [19]

Ortloff et al.

[11] Patent Number: 4,703,954
[45] Date of Patent: Nov. 3, 1987

[54] THREADED PIPE CONNECTION HAVING WEDGE THREADS

[75] Inventors: Donald J. Ortloff; Doyle E. Reeves, both of Houston, Tex.

[73] Assignee: Hydril Company, Houston, Tex.

[21] Appl. No.: 796,069

[22] Filed: Nov. 8, 1985

[51] Int. Cl.$^4$ .............................................. F16L 15/00
[52] U.S. Cl. .................................. 285/115; 285/334; 285/332.3
[58] Field of Search ............... 285/115, 334, 333, 355, 285/390

[56] References Cited

U.S. PATENT DOCUMENTS

| | | | |
|---|---|---|---|
| 1,817,808 | 8/1931 | Eaton | 285/390 X |
| 2,051,499 | 8/1936 | Siegle | 285/390 X |
| 2,122,757 | 7/1938 | Scott | 285/334 |
| 2,177,100 | 10/1939 | Frame | 285/334 |
| 2,179,202 | 11/1939 | Simpson | 285/355 |
| 2,450,452 | 10/1948 | Scott | 285/115 |
| 2,772,102 | 11/1956 | Webb | 285/334 |
| 3,126,214 | 3/1964 | Wong et al. | 285/333 X |
| 3,635,500 | 1/1972 | Kirby | 285/115 |
| 3,989,284 | 11/1976 | Blose | 285/334 X |
| 4,407,527 | 10/1983 | Reimert | 285/115 X |
| 4,521,042 | 6/1985 | Blackburn et al. | 285/334 |
| 4,600,224 | 7/1986 | Blose | 285/334 |
| 4,629,222 | 12/1986 | Dearden et al. | 285/334 |

*Primary Examiner*—Thomas F. Callaghan
*Attorney, Agent, or Firm*—Vaden, Eickenroht, Thompson & Boulware

[57] ABSTRACT

A threaded pipe connection is disclosed of the wedge-shaped thread type that avoids high stress concentrations in the box between the first thread and the end of the box by making the length of the box between the first thread and the end of the box equal to or greater than 5% of the pipe diameter and by providing clearance between the crest of the first full thread on the box and the root of the last thread on the pin and between the crest of the last full thread on the pin and the root of the first full thread on the box.

4 Claims, 4 Drawing Figures

THREADED PIPE CONNECTION HAVING WEDGE THREADS

This invention relates to an improvement in threaded pipe connections having wedge threads and, in particular, to an improvement in such threads that reduces the concentration of stress that occurs in the box between the first thread of the box and the end of the box when the connection is subjected to tensile loads and fluid pressures.

In pipe connections having wedge threads, i.e. having threads that increase in width in opposite directions on the pin and box and where the connection is sealed by metal-to-metal seals formed between the flanks of the threads and the roots and crests of the threads, the box and pin are locked together when the connection is made up so that the box and pin react to the loads placed on the connection as a unit. This can result in very high stress concentrations in the box between the first thread and the end of the box.

Therefore it is an object of this invention to provide a threaded connection of the wedge thread type that greatly reduces the stresses in the portion of the box between the first thread and the end of the box.

It is another object of this invention to provide such a connection in which the stresses in the box between the end of the box and the first full thread are reduced to an acceptable level by making the length of the box between the first thread of the box and the end of the box equal to at least 5% of the diameter of the pipe to which the box is connected, either integrally or as a coupling.

It is a further object of this invention to provide such a threaded connection in which the stress concentrations are further reduced in this area of the box by lengthening the distance betwen the first full thread on the box and the end of the box and by also providing clearance between at least the first full thread crest on the box and the root of the last full thread on the pin and between at least the last full thread crest on the pin and the root of the first full thread on the box.

These and other objects, advantages, and features of this invention will be apparent to those skilled in the art from a consideration of this specification including the attached drawings and appended claims.

IN THE DRAWINGS

Figure 2:
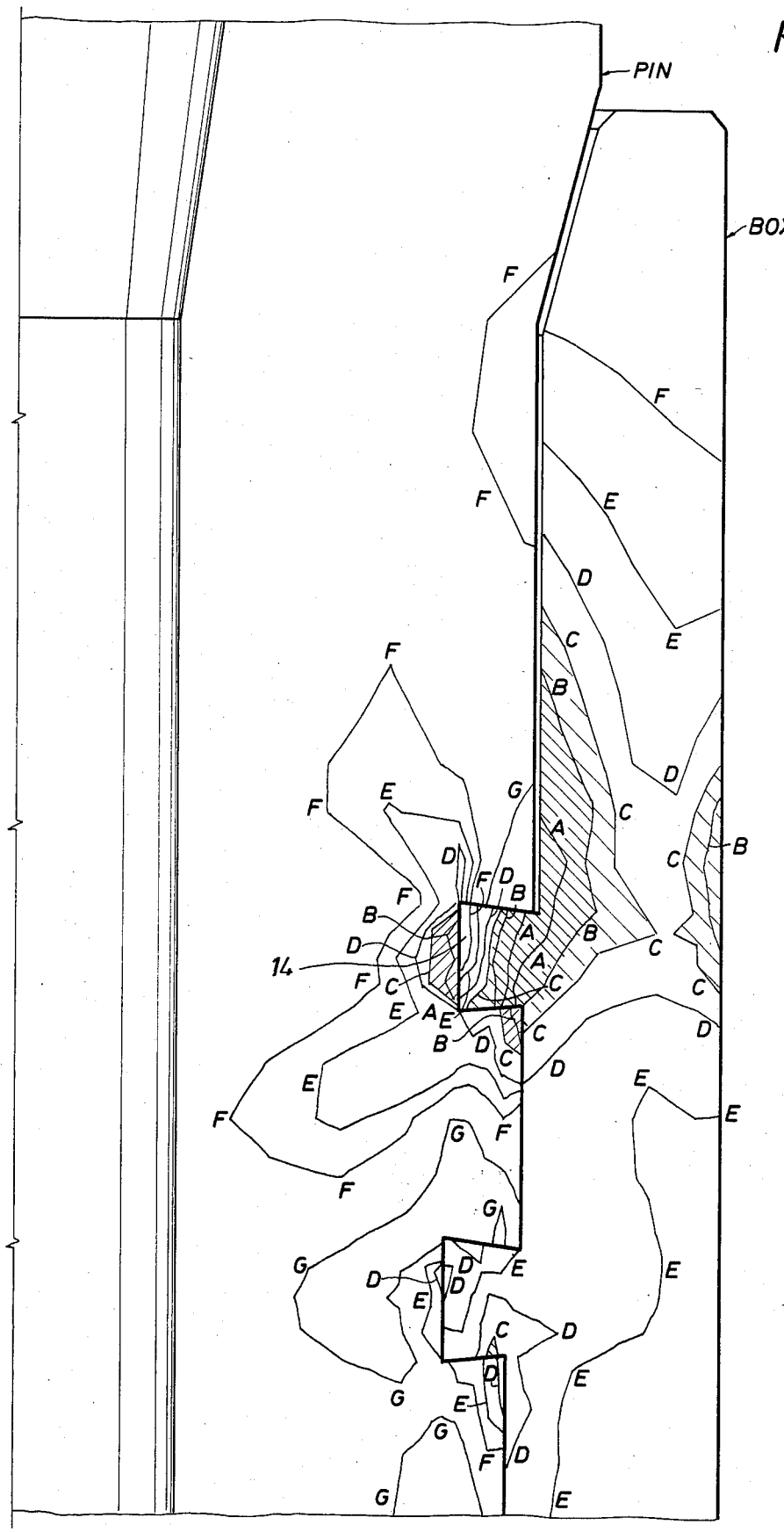
FIG. 2 is a stress plot of the same area of such connection when the box has been elongated to provide a greaterdistance between the first thread of the box and the end of the box.
Figure 3:
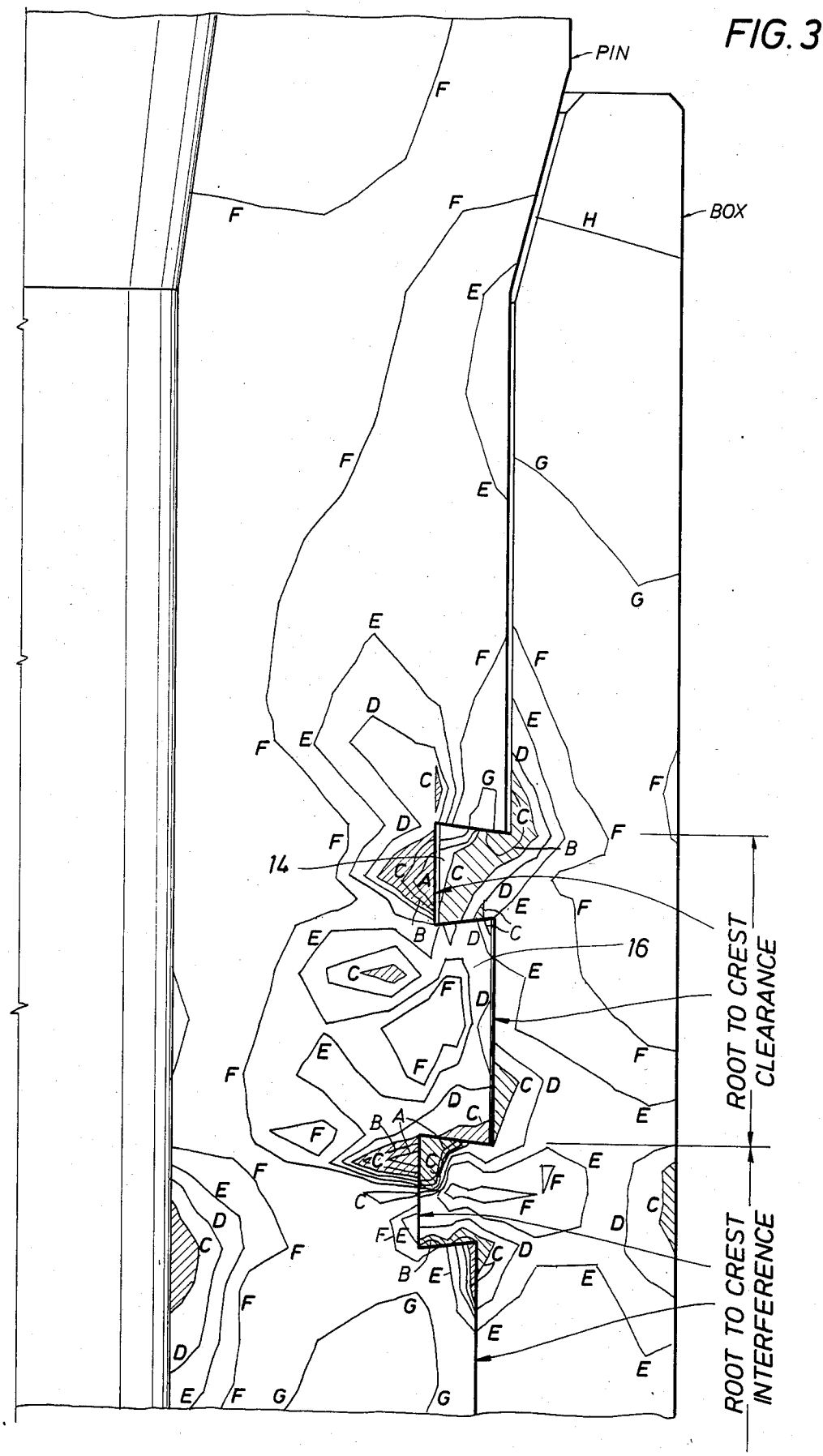
Figure 4:
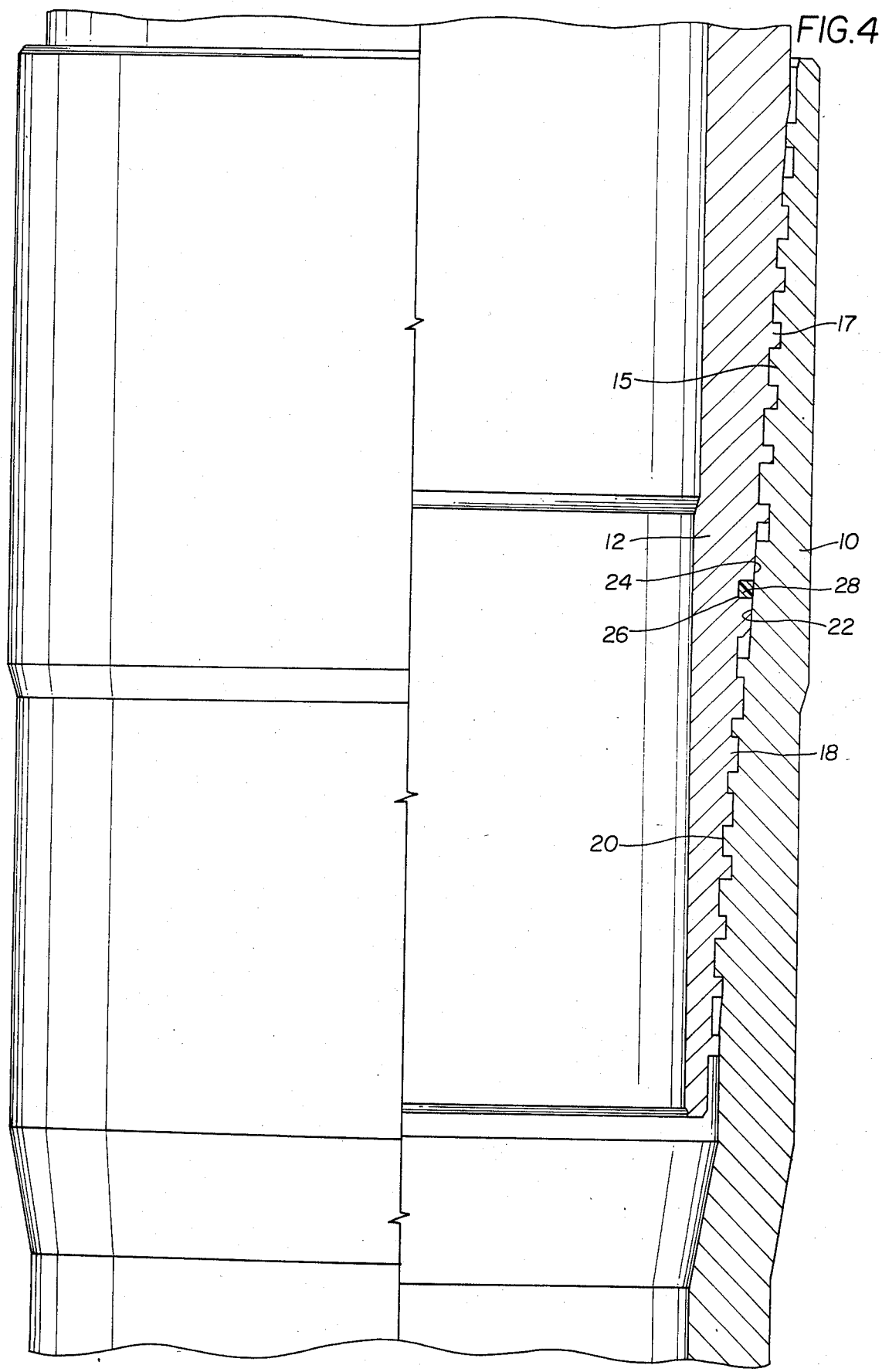

FIG. 3 is a stress plot of the same area with the same extension of the box as in FIG. 2, but also with clearance between the crest of the first full thread on the box and the root of the last full thread ont he pin and between the crest of the last full thread on the pin and the root of the first full thread on the box; and FIG. 4 is a view, partly in elevation and partly in section, of a wedge thread connection having stepped threads.

Figure 1:
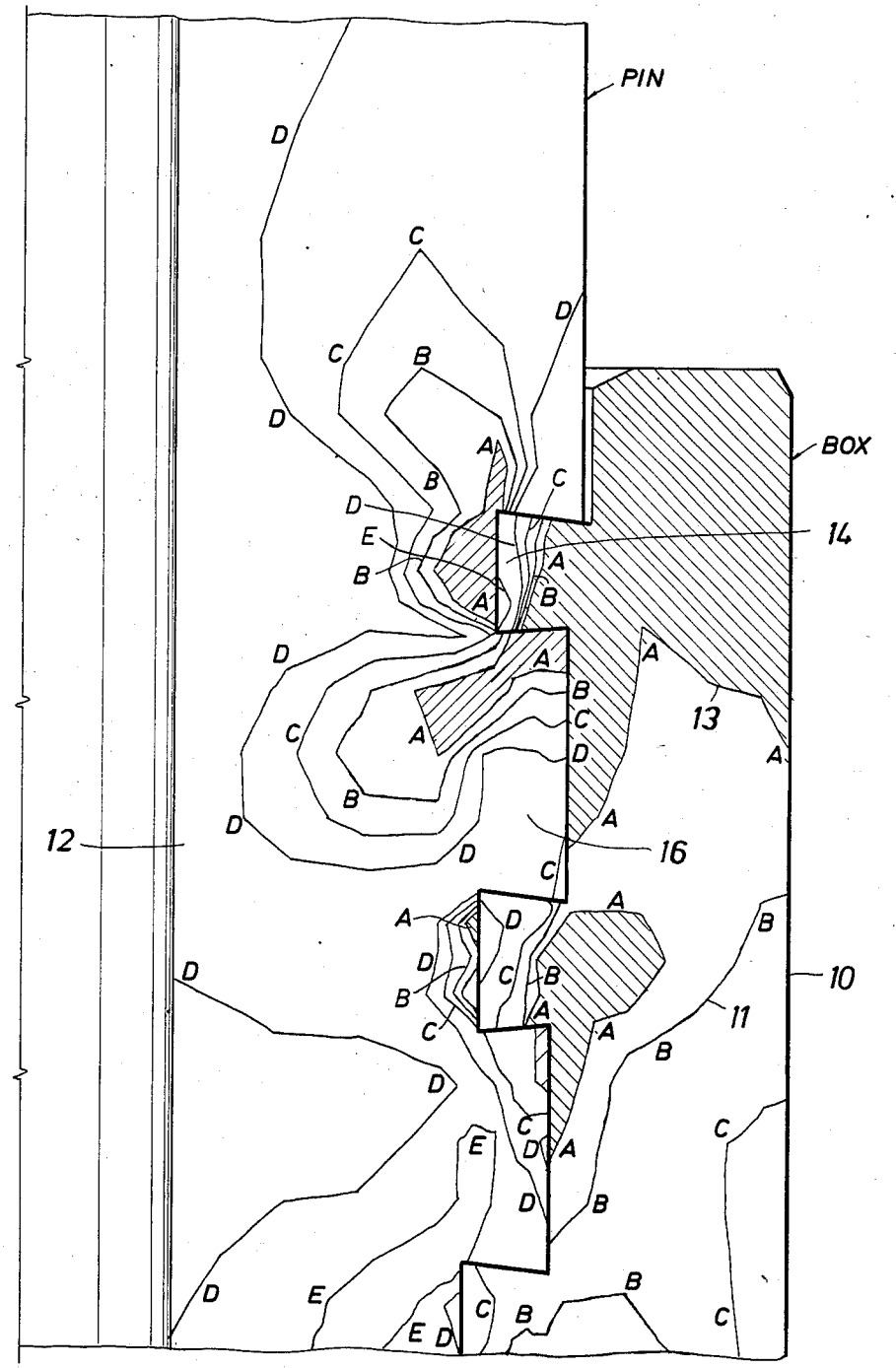
FIG. 1 is a computer produced stress plot of the portion of a prior cut wedge thread connection between the first and second threads of the box and the end of the box.

For the stress plot of FIG. 1, the computer was programmed for A to indicate stresses of 110,000 psi and above, B is 100,000 psi, C is 90,000 psi, D is 80,000 psi, E is 60,000 psi, F is 40,000 psi, G is 20,000 psi and H is zero stress. Therefore, the stress in the end of box 10 between contour line 11 and contour line 13 is between 100,000 psi and 110,000 psi, which is indicated by the letters B and A, respectively. The stress between stress line 13 and the end of the box is equal to or greater than 110,000 psi, which is the yield point of the material. This area of high stress, as indicated by the cross-hatching, extends down through a portion of first full thread 14 on box 10 and into last full thread 16 on pin 12, both below the root of the last full thread of the pin and on either side thereof.

The stresses in FIG. 1 were produced on a computer model bases on a connection having wedge threads for $9\frac{5}{8}''$-36 lb. P-110 casing when subjected to 607,000 lbs. of tensile load and 7,040 psi internal pressure. The stresses in the end of the box shown in FIG. 1 are not acceptable since they will cause a large portion of the box to yield across the membrane and also cause the pin to be subjected to massive localized yielding as required to relieve the stress.

In accordance with this invention, the distance between first thread 14 and the end of box 10 was increased as shown in FIG. 2 and the connection was subjected to the same loads. Here, however, the computer was programmed for A to indicate stresses of 130,000 psi and above. B, C, D, E, and F indicate 10,000 psi reductions in stress, while G, H, I, and J indicate 20,000 psi reductions. With this change in the stress scale, stresses indicated by A, B, and C all exceed the yield strength of the material. Therefore, the stress plot of FIG. 2 shows that only the area of the box adjacent the first thread and the area in the pin directly under the crest of the first thread of the box are stressed beyond the yield strength of the material. There is still a substantial area on the box that is stressed beyond the yield point but not across the box membrane. This is a substantial improvement over the results of FIG. 1 and is acceptable. In FIG. 2, the length of the box between the first thread and the end is about 8% of the pipe diameter.

In an effort to further reduce the stress concentrations that are beyond the yield strength of the material in the connection, a stress plot was made of the same connection as FIG. 2 but with a further improvement. Radial clearance was provided between the crest of first full thread 14 on the box and the root of the last full thread 16 on the pin and between last thread 16 on the pin and the root of first thread 14 on the box. This resulted in a substantial reduction of peak stresses and an improved distribution of the areas where the stress exceeds the yield point of the material. Some localized high stresses still remain in the area around the first thread on the box and in the pin below thread 14, but the area involved is reduced and the load carrying ability of the sections are improved. Also there is now an area adjacent the second full thread on the box that exceeds the yield strength of the material. This, however, is a substantial improvement over FIG. 2.

It has been determined that the distance between the full thread on the box at the end of the box should be at least equal to 5% of the outside diameter of the pipe with which the box is associated. The box can be a part of a coupling connecting two joints of pipe or it can be an integral part of the pipe.

An example of the latter is shown in FIG. 4. The connection comprises box 10 and pin 12. The internal threads on the box are tapered and are divided into large step threads 15 and small step threads 18 that mate with external tapered large step threads 17 and small step threads 20 on the pin. The threads are dovetail in shape in cross-section and increse in width in one direction on the pin and in the opposite direction on the box. The third thread of the box is shown in full engagement, however, the second thread would probably be shown in substantially full engagement if the section was taken somewhere as indicated at the lower end of the pin where the second thread is shown in full engagement.

Tapered surface 22 on the box engages tapered surface 24 on the pin to form a metal-to-metal seal. Resilient seal ring 28 located in annular groove 26 in surface 24 provides an additional seal located between the metal-to-metal seals on either side of the seal ring.

From the foregoing it will be seen that this invention is one well adapted to attain all of the ends and objects hereinabove set forth, together with other advantages that are obvious and that are inherent to the unique features of this threaded connection.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a threaded member, a box on one end having tapered internal wedge threads that increase in width in one direction and a pin on the other end having external wedge threads that increase in width in the other direction, said threads on both the box and the pin being designed to engage mating threads on a pin and box and form metal-to-metal seals between the flanks of the threads and between the roots and crests of the threads, the improvement comprising an end portion on the box that does not engage the pin and that extends beyond the first thread a minimum distance equal to about 5% of the outside diameter of the threaded member and the height of the last full thread of the pin and the first full thread of the box being reduced to provide radial clearance between the roots and crests of these threads when the connection is made up to reduce the areas of high stress in the box between the first substantially fully engaged thread of the box and the end of the box to reduce the stress in the box when the connection is subjected to tensile forces and fluid pressure.

2. The threaded member of claim 1 in which the threads on the member are divided into a large step and a small step having a major diameter and a minor diameter smaller than the major and minor diameters of the large step.

3. In a threaded pipe connection comprising a box having tapered internal threads and a pin having tapered external threads for mating with the internal threads of the box to make up the joint, said threads being dovetail shaped in cross-sectiona nd increase in width in one direction on the box and in the other direction on the pin so the roots, crests, and flanks of the threads engage when the connection is made up to seal the connection and lock the pin and the box together the improvement comprising, said end portion of the box beyond the first thread being spaced from the box and extending a distance equal to at least 5% of the diameter of the pipe and the height of the last full thread of the pin and the first full thread of the box being reduced to provide radial clearance between the roots and crests of these threads when the connection is made up to reduce the areas of high stress in the box between the first substantially fully engaged thread of the box and the end of the box when the connection is subjected to tensile forces and fluid pressure.

4. The threaded pipe connection of claim 3 in which the threads are divided into large steps and small steps having a major diameter and a minor diameter smaller tha the major and minor diameters of the large steps.

* * * * *